United States Patent
Soldani et al.

(10) Patent No.: US 6,872,410 B2
(45) Date of Patent: Mar. 29, 2005

(54) EDIBLE CHEWING GUM AND PROCESS FOR PREPARING

(75) Inventors: Cristiana Soldani, Milan (IT); Andrew Steven Whitehouse, Harrogate (GB); Deborah Roberts, Savigny (CH)

(73) Assignee: Nestec S.A., Vevey (CH)

( * ) Notice: Subject to any disclaimer, the term of this patent is extended or adjusted under 35 U.S.C. 154(b) by 230 days.

(21) Appl. No.: 10/236,891

(22) Filed: Sep. 5, 2002

(65) Prior Publication Data

US 2003/0039720 A1 Feb. 27, 2003

Related U.S. Application Data

(63) Continuation of application No. PCT/EP01/01551, filed on Feb. 13, 2001.

(30) Foreign Application Priority Data

Mar. 17, 2000 (GB) .............................................. 0006555

(51) Int. Cl.[7] .............................................. A23G 3/30
(52) U.S. Cl. .............................................. 426/3; 426/5
(58) Field of Search ........................... 426/3, 5; 424/48, 424/440

(56) References Cited

U.S. PATENT DOCUMENTS

| | | | |
|---|---|---|---|
| 4,765,991 A | * 8/1988 | Cherukuri et al. ............. | 426/3 |
| 5,366,740 A | 11/1994 | Shaw et al. ..................... | 426/3 |
| 5,433,960 A | * 7/1995 | Meyers ........................... | 426/5 |
| 5,436,013 A | * 7/1995 | Synosky et al. ................ | 426/3 |
| 5,441,750 A | * 8/1995 | Synosky et al. ................ | 426/3 |
| 5,516,530 A | 5/1996 | Lo et al. ...................... | 424/473 |
| 5,525,351 A | 6/1996 | Dam ........................... | 424/440 |
| 5,580,590 A | 12/1996 | Hartman ....................... | 426/3 |
| 5,645,853 A | * 7/1997 | Winston et al. ............. | 426/3 X |
| 5,733,574 A | 3/1998 | Dam ........................... | 424/464 |
| 6,110,495 A | 8/2000 | Dam ........................... | 424/464 |

FOREIGN PATENT DOCUMENTS

| | | |
|---|---|---|
| CN | 8603122 | 1/1987 |
| CN | 1125055 | 6/1996 |
| JP | 52096771 | 8/1977 |
| JP | 52120168 | 10/1977 |
| JP | 53079045 | 7/1978 |
| JP | 54044071 | 4/1979 |
| JP | 02211828 A | 8/1980 |
| JP | 05139979 A | 6/1993 |
| JP | 9047226 | 2/1997 |
| WO | WO 94/17673 | 8/1994 |
| WO | WO 96/28041 | 9/1996 |
| WO | WO 00/19837 | 4/2000 |
| WO | WO 01/01788 A1 | 1/2001 |
| WO | WO 01/10239 | 2/2001 |

* cited by examiner

*Primary Examiner*—Arthur L. Corbin
(74) *Attorney, Agent, or Firm*—Winston & Strawn LLP

(57) ABSTRACT

An edible chewing gum having a gum base consisting essentially of agar and one or more soluble ingredients as well as a process for its preparation.

19 Claims, No Drawings

EDIBLE CHEWING GUM AND PROCESS FOR PREPARING

CROSS-REFERENCE TO RELATED APPLICATION

The present application is a continuation of the US national stage designation of International Application PCT/EP01/01551 filed Feb. 13, 2001, the content of which is expressly incorporated herein by reference thereto.

FIELD OF THE INVENTION

The present invention relates to an edible chewing gum, especially to a gluten-free edible chewing gum as well as a process for its preparation.

BACKGROUND OF THE INVENTION

Ordinary chewing gum contains a generally neutral and essentially tasteless insoluble masticatory gum base which is usually a plasticized rubber or polymer which is softened and has added texturizers, anti-tacking agents and antioxidants, etc. The base is to be chewed rather than eaten in itself and is a vehicle for one or more non-masticatory active ingredients such as flavors, colors and sweeteners. On the other hand, edible chewing gum contains a base which can not only be chewed but can also be eaten and digested in addition to the non-masticatory active ingredients such as flavors and sweeteners.

JP 54044071 A describes an edible chewing gum preparation using a crosslinked gluten composition as base which is obtained from gluten and an edible crosslinking agent such as agar, by crosslinking in presence of water. The base of this edible chewing gum is gluten-based, and a significant disadvantage of gluten is that certain people exhibit an allergic intolerance to gluten. Thus, improvements in these type products are desired.

SUMMARY OF THE INVENTION

We have found surprisingly that agar can be used in low quantities in the absence or substantial absence of gluten as the edible gum base giving an edible chewing gum product which still has a desirable long-lasting cohesive chew.

According to the present invention there is provided an edible chewing gum having a gum base comprising agar and one or more soluble non-masticatory active ingredients mixed into the base.

Agar is a polysaccharide gelling agent which is extracted from red seaweed. The commercial forms available are usually strips, flakes or powders and the molecular weight is typically over 20,000. Any commercially available form of agar is suitable in this invention.

DETAILED DESCRIPTION OF THE INVENTION

The amount of agar used as the gum base may be from 0.1% to 5% and preferably from 0.5% to 2% by weight based on the weight of the edible chewing gum. The agar has to be hydrated with water and the amount of water present is from 20 to 50% and preferably from 30 to 40% by weight based on the weight of the pre-cooking ingredient mix.

The soluble non-masticatory active ingredients mixed into the base include sweeteners, flavors, acids, colors, humectants, fats, emulsifiers, flavor enhancers, or functional ingredients such as breath fresheners, medicinal or pharmaceutical agents.

When the edible chewing gum contains sweeteners, it usually contains about 30% to 90%, preferably from 40% to 70%, by weight based on the weight of the edible chewing gum, of syrup or sugars. The syrup or sugars may be, for example, corn syrup; glucose syrup; invert syrup; high fructose syrup; (crystalline) sucrose; fructose; maltose; trehalose. Different types of sugar systems can be used to manipulate the final textural properties of the chewy confectionery product. For example, the sugar-based edible chewing gum of the present invention may contain crystalline sucrose.

If desired, the edible chewing gum may be sugar-free in which case it may contain a bulk sweetener, e.g., isomalt, maltitol, sorbitol, mannitol, lactitol, erythritol and the like. Since most of these bulk sweeteners are not as sweet as sucrose, high intensity sweeteners are advantageously employed to make sugar-free chewing gum more palatable, e.g., an artificial sweetener such as saccharin, aspartame, cyclamates, acesulfame K or thaumatin.

When the edible chewing gum contains flavors, the flavor may be any flavor that would be recognized by a person skilled in the art as suitable for a chewing gum, e.g., it may be an essential oil, a synthetic flavor, or mixtures thereof. The oil may be derived from plants or fruits such as citrus oils, fruit essences, peppermint oil, spearmint oil, clove oil, oil of wintergreen, aniseed, etc. The flavor may be used in a sensorially acceptable amount, e.g., generally from 0.1 to 1%, preferably from 0.25 to 0.75% by weight based on the weight of the edible chewing gum.

When the edible chewing gum contains an acid, it should be a food-acceptable acid, for example, lactic acid, malic acid, tartaric acid, ascorbic acid, hydrochloric acid, or citric acid. The amount added will depend on the final product but may be in the range of from about 0.1% to 5%, preferably from about 1% to 2.5%, by weight based on the weight of the edible chewing gum. When fruit flavors such as orange, lemon, strawberry or grape are used, fruit acids may be used to avoid a flat flavor effect.

When the edible chewing gum contains colors, humectants, fats, emulsifiers, flavor enhancers, breath fresheners, medicinal or pharmaceutical agents, each may be present in amounts suitable for their function which amounts are readily determinable by a person skilled in the art. The color may be any food colorant within legislative limits.

When the edible chewing gum contains a humectant, the humectant may be glycerol, sorbitol or propylene glycol. When the edible chewing gum contains a fat, the fat may be added to improve masticability and mouthfeel, and to eliminate or reduce stickiness. The fat may be, for instance, hydrogenated, refined, fractionated fat with melting point from 10–50° C., preferably from 15–45° C. and more preferably from 20–40° C. The amount of fat may be from 1 to 10% and preferably from 2.5 to 7.5% by weight based on the weight of the edible chewing gum. When the edible chewing gum contains an emulsifier, the emulsifier may be lecithin or ammonium phosphatide, glyceryl monostearate (GMS) or Citrem. When the edible chewing gum contains a flavor enhancer, this may be for example, talin.

When the edible chewing gum contains a functional ingredient, this may be, for instance, casein glyco macropeptide (CGMP), acid carbonate of calcium (baking soda), caffeine, guarana extracts, ginseng, herbal extracts, etc.

If desired, other hydrocolloids can be blended into the mixture of ingredients, e.g., in amounts of from 0.1–1.0% by weight based on the weight of the mixture of ingredients.

The edible chewing gum of the present invention may be prepared by conventional methods. For example, the ingredients may be blended to form a syrup, then cooked, shaped, and, if necessary, dried. The processing methods selected will affect the final texture of the products.

The agar has to be dispersed in water and hydrated; then the dispersion is heated slowly and slowly brought up just below the boiling point preferably with agitation, e.g., stirring with a mixer. The solution is held, e.g., for from 1–10 minutes until the agar is dissolved below the boiling point while continually stirring with a mixer. Then the other ingredients are blended with agitation, for example, using conventional stirrers. Preferably a syrup of sugars, agar, and water are blended first, followed by the addition of the remaining additives, for example, acid, flavor, color, humectants, etc. (acid, flavor, etc. are normally added after cooking) to give a syrup having the desired final solids content.

The initial mixture of ingredients may be cooked by open pan boiling, or by for example, a coil cooker, plate heat exchanger, or a cooker extruder. The operating conditions will vary depending on the selected cooking equipment, formulation, ingredients, etc.

The product may then be shaped using conventional techniques and subjected to a cooling/drying stage as required. The moisture content of the final product may be advantageously from 5–20% by weight.

The cooking process may also include more elaborate manufacturing processes such as continuous evaporation; the inclusion of an aerating stage by beating or pulling; continuous cooling, such as, by cooling rollers; and forming operations such as extrusion, rope forming, lamination, cut and wrap forming, or dye-forming.

EXAMPLES

The following example further illustrates the present invention in providing formulation and processing details for edible chewing gum with agar according to the invention. The example is intended for illustrative purposes and is not intended to be limiting. Percentages are given by weight.

Example 1

The edible chewing gum is produced by a simple process employing the open pan method for cooking using a stirred steamed-jacketed confectionery boiling pan. The ingredients are as follows:

| Formulation: | Percent by weight |
|---|---|
| Water | 35 |
| Agar Agar | 1 |
| Glucose syrup 42 DE | 38 |
| Sugar | 20 |
| GMS | 1 |
| Hydrogenated vegetable fat | 5 |

The agar is dispersed in the recipe water and the dispersion is heated close to boiling (~95° C.) using a high speed mixer to give rapid dispersion and the solution is held for 5 minutes with continuous stirring until the agar is dissolved below the boiling point. The remaining ingredients are then combined with this solution. The batch is heated using a steam jacket to obtain a boiling temperature, which may be in the range of 110–120° C., depending on the desired final texture.

Once the final cooking temperature is reached the mass is cooled to 80/90° C. under agitation and afterwards there is added 1% citric acid @ 50TS, 0.003% Ponceau 4R color and 0.3% strawberry flavor. The mass is finally cooled down for example by casting onto a cold slab. The product can then be apportioned as required.

What is claimed is:

1. An edible chewing gum consisting essentially of an edible gum base comprising agar and at least one soluble active ingredient.

2. The chewing gum according to claim 1, wherein the agar is present in an amount from about 0.1% to about 5% by weight of the chewing gum.

3. The chewing gum according to claim 1, further comprising water, wherein the water is present in an amount from about 20 to about 50% by weight of the chewing gum.

4. The chewing gum according to claim 1, wherein the soluble active ingredient is selected from the group including sweeteners, flavors, acids, colors, humectants, fats, emulsifiers, flavor enhancers, breath fresheners, medicinal agents, pharmaceutical agents or a combination thereof.

5. The chewing gum according to claim 4, wherein the sweeteners are selected from the group consisting of syrups or sugars, and further wherein the sweetener is present in an amount between about 30% to about 90% by weight of the edible chewing gum.

6. The chewing gum according to claim 1, wherein the chewing gum further comprises a bulk sweetener.

7. The chewing gum according to claim 6, wherein the bulk sweetener is selected from the group including isomalt, maltitol, sorbitol, mannitol, lactitol, erythritol or a combination thereof.

8. The chewing gum according to claim 1, wherein the chewing gum has a moisture content from about 5% to about 20% by weight of the chewing gum.

9. The chewing gum according to claim 1, wherein the chewing gum is gluten-free and is free of plasticized rubbers or plasticized polymers.

10. A process for preparing an edible chewing gum base, which comprises:

dispersing agar in water to form an agar dispersion;

combining at least one active ingredient with the agar dispersion;

cooking the agar dispersion combined with the at least one active ingredient to form an edible gum base consisting essentially of agar and the least one active ingredient; and shaping the edible gum base.

11. The process according to claim 10, wherein the dispersing step of drying the edible gum base.

12. The process according to claim 11, wherein the heated dispersion is held for about 1 to about 10 minutes until the agar is dissolved.

13. The process according to claim 10, wherein the dispersing step comprises:

agitating and heating the agar dispersion to a temperature below boiling point; and maintaining the agitated heated dispersion at a temperature below the boiling point to ensure dissolution of the agar in the water.

14. The process according to claim 13, wherein the combining step comprises blending the agar dispersion and the at least one active ingredient to form a homogenous dispersion.

15. The process according to claim 10, further comprising
blending a syrup comprising one or more sugar, agar, and water; and
adding to the blend at least one of an additive selected from the group including acid, flavor, color, humectant to provide a syrup having a desired final solids content, wherein the gum is gluten-free and is free of plasticized rubbers or plasticized polymers.

16. The process according to claim 15, wherein the cooking step is carried out by open pan boiling or continuous evaporation.

17. The process according to claim 10, wherein the edible gum product has a moisture content of from about 5% to about 20% by weight.

18. A chewing gum base produced by the process of claim 10.

19. The chewing gum according to claim 18, wherein the chewing gum is gluten-free and is free of plasticized rubbers or plasticized polymers.

* * * * *

UNITED STATES PATENT AND TRADEMARK OFFICE
CERTIFICATE OF CORRECTION

PATENT NO. : 6,872,410 B2
DATED : March 29, 2005
INVENTOR(S) : Soldani et al.

It is certified that error appears in the above-identified patent and that said Letters Patent is hereby corrected as shown below:

<u>Column 4,</u>
Lines 51-52, after "The process according to claim 10," delete "wherein the dispersing" and insert -- further including the --.

Signed and Sealed this

Thirty-first Day of May, 2005

JON W. DUDAS
*Director of the United States Patent and Trademark Office*